(12) United States Patent
Gebhart

(10) Patent No.: US 6,221,235 B1
(45) Date of Patent: Apr. 24, 2001

(54) REMOVAL OF SACRIFICIAL CORES BY ELECTROCHEMICAL MACHINING

(75) Inventor: Lawrence E. Gebhart, Clayton, OH (US)

(73) Assignee: Faraday Technology Marketing Group LLC, Troy, OH (US)

( * ) Notice: Subject to any disclaimer, the term of this patent is extended or adjusted under 35 U.S.C. 154(b) by 0 days.

(21) Appl. No.: 09/200,959

(22) Filed: Nov. 30, 1998

(51) Int. Cl.$^7$ ............................................... B23H 3/00

(52) U.S. Cl. ........................ 205/654; 205/650; 205/651; 205/670; 205/672; 205/673; 204/290 R; 204/280

(58) Field of Search ................................. 205/650, 651, 205/654, 670, 672, 673; 204/290 R

(56) References Cited

U.S. PATENT DOCUMENTS

| | | | |
|---|---|---|---|
| 3,616,343 | 10/1971 | Inoue | 204/143 M |
| 4,337,038 | * 6/1982 | Saito et al. | 433/33 |
| 4,459,190 | 7/1984 | Inoue | 204/129.35 |
| 4,913,403 | * 4/1990 | Plowman et al. | 266/44 |
| 5,186,796 | 2/1993 | Kelly et al. | 204/129.35 |
| 5,249,358 | 10/1993 | Tousignant, et al. | 29/890.03 |

* cited by examiner

Primary Examiner—Kathryn Gorgos
Assistant Examiner—Christopher M. Keehan
(74) Attorney, Agent, or Firm—Vorys, Sater Seymour and Pease LLP

(57) ABSTRACT

A sacrificial cores in castings of metallic or non-metallic materials is made from a metal that can be electrolytically dissolved, and is removed from the casting by electrochemical machining. The sacrificial core may be a hollow shell incorporating an integral electrode within the shell and electrically insulated from the shell.

15 Claims, 7 Drawing Sheets

REMOVAL OF SACRIFICIAL CORES BY ELECTROCHEMICAL MACHINING

ORIGIN OF THE INVENTION

The experimental work leading to this invention was funded in part by U.S. Air Force Materials Command Contract No. F33615-97-C-5275.

BACKGROUND OF THE INVENTION

1. Field of the Invention

This invention relates to removal of cores from castings and more particularly to removal of sacrificial cores by electrochemical machining.

2. Brief Description of the Prior Art

In the manufacture of complex parts from refractory metals, it is sometimes necessary to provide recesses and/or passages within the body of the casting. Forming such recesses or passages by conventional mechanical machining may be difficult, impractical or even impossible for some refractory materials and/or some geometrical shapes of the casting. Accordingly, processes have been developed to produce such internal structures by casting. Typically, a sacrificial core is positioned within the mold in which the article is cast. The mold is then filled with molten metal and cooled to solidify the metal. The mold is then opened and the part is removed. However, ordinarily the core must be separately removed. In many cases the shape of the core prevents it from being removed in one piece, especially in the case of precision castings, where the final dimensions of the article are formed in the mold. Consequently, the use of sacrificial cores that are removed by destroying them has been developed.

Ceramic cores have been used in casting refractory metal parts. However, the removal of the hard ceramic must be accomplished by mechanical means, which are time-consuming and costly. Accordingly, it has been proposed to use metal cores that can be removed by chemical leaching. For example, the use of steel cores has been proposed for casting articles from refractory alloys of cobalt, nickel, titanium and the like. The steel cores may be removed by chemical leaching with strong acids such as nitric and hydrochloric acids. However, even with the use of such corrosive materials, removal of the cores by chemical leaching is extremely slow and difficult, especially in deep recesses and narrow passages.

Accordingly, a need has continued to exist for a method of removing sacrificial cores from castings that is simpler and more rapid than methods hitherto employed.

SUMMARY OF THE INVENTION

The difficulties encountered in removing sacrificial cores from castings have now been alleviated by the method of the invention wherein the sacrificial core is made from a metal that can be electrolytically dissolved. The casting with sacrificial core embedded therein, together with a counter-electrode as a cathode, is immersed in or flooded with an electrolyte, and an electric current is passed between the core and the counterelectrode with the core being made generally anodic with respect to the counterelectrode, whereby the sacrificial core is electrochemically dissolved.

Accordingly, it is an object of the invention to provide an electrochemical method for removing a sacrificial core from a casting.

A further object is to provide a method for electrolytically removing a sacrificial core from a casting.

A further object is to provide a sacrificial core for a casting.

A further object is to provide a sacrificial core for a casting having an integral electrode.

Further objects of the invention will become apparent from the description of the invention which follows.

DETAILED DESCRIPTION OF THE INVENTION AND PREFERRED EMBODIMENTS

Figure 1:
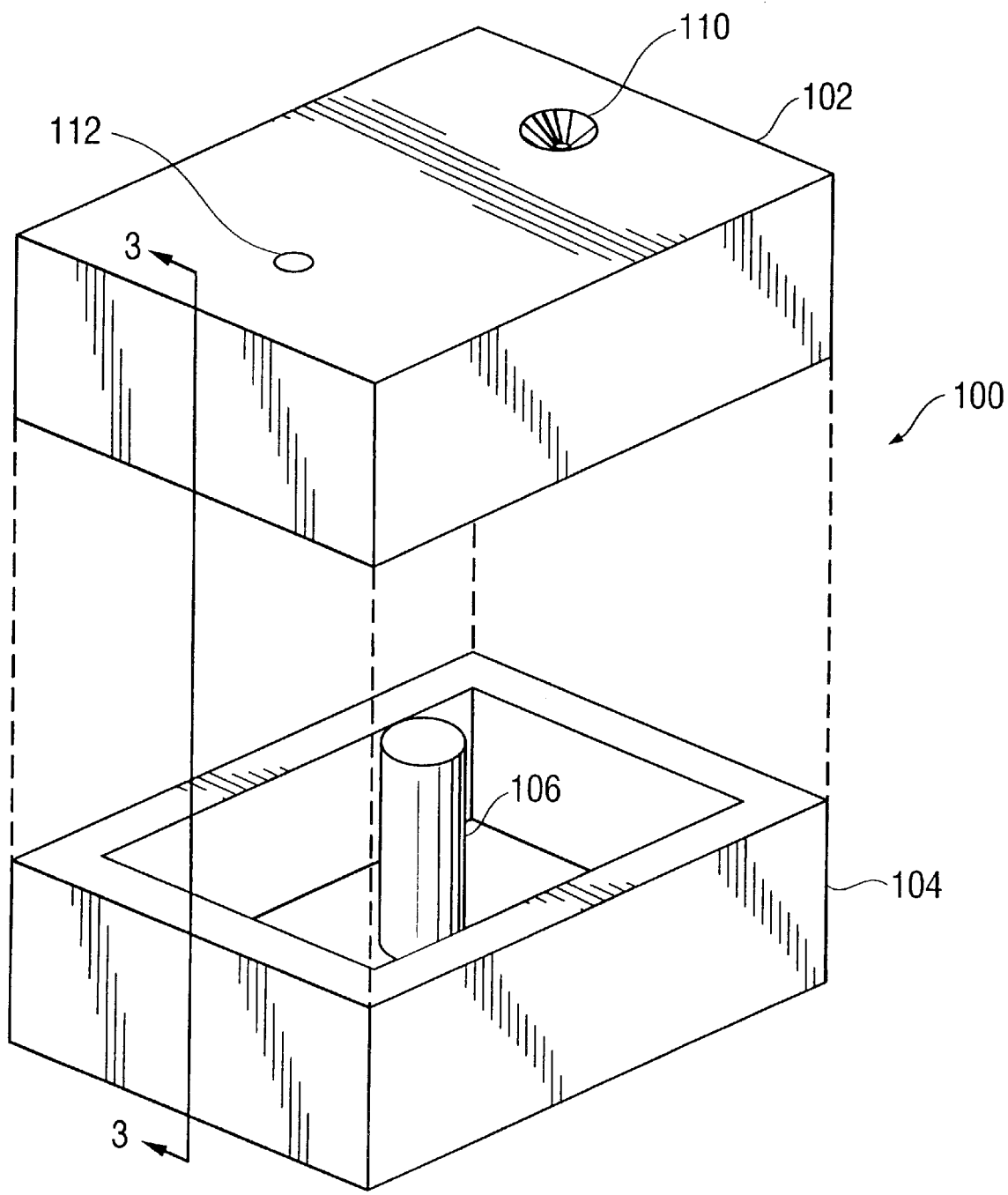
FIG. 1 is a schematic isometric view of a mold used to prepare a casting having a sacrificial core.

According to the invention a casting is prepared having a core which is made of a metal that can be dissolved by electrochemical machining. The casting can be prepared by any conventional procedure, such as permanent mold casting, investment casting, or the like. Typically a mold is first prepared to define the outer surface of the object to be cast. A core is then fixed within the mold to form a recess or passage in the body of the cast article. The mold is then closed and filled with the material to be molded, which is introduced in liquid form. The material may be any substance that can be introduced into the mold as a liquid and subsequently hardened. Ordinarily the material is introduced in a molten state and hardened by cooling. Thus, a molten metal or a molten thermoplastic material can be poured or injected into the mold and allowed to cool to form a solid shaped article. The mold is then opened and the casting containing the sacrificial core is removed. The casting containing a sacrificial core to be removed by electrochemical machining can be prepared by any conventional casting procedure. Accordingly, sand casting, permanent mold casting, investment (lost wax) casting, and the like, can be used to prepare a casting containing one or more sacrificial cores.

The material of the core is selected so that it may be removed by electrochemical machining without eroding or dissolving the material that forms the body of the casting. For example, if the body of the casting is made of a metal, the material of the sacrificial core may be chosen to have an electrode potential that permits it to be dissolved in an electrochemical machining process at a potential that is less than that at which the metal of the casting is dissolved. In other cases, if the cast metal becomes passivated under the conditions of the electrochemical machining, a metal sacrificial core that exhibits less passivation under the conditions may be selectively removed by electrochemical machining. Furthermore, the electrochemical potential may be established during electrolytic removal such that the sacrificial core is removed preferentially compared to the cast part. If the cast material is not an electrical conductor, e.g., a ceramic or a natural or synthetic resin, the metal sacrificial core can evidently be removed electrolytically without affecting the material of the casting, provided that an alternative means of electrical contact is made and maintained with the core.

The process of the invention is particularly suited for preparing shaped articles from refractory metals and alloys such as nickel, cobalt, titanium and the like. For castings made of such alloys, the sacrificial core is preferably made from a material having a high melting point, such as steel.

In order to remove the sacrificial core, the casting containing such a core is contacted or immersed in or flooded with an electrolyte along with a counterelectrode to thereby form an electrochemical machining cell. The counterelectrode is positioned adjacent to the core to be removed, and an electric current is passed between the electrodes, with the core being made generally anodic with respect to the counterelectrode. The counterelectrode may be advanced, if necessary to maintain an advantageous geometrical relationship with the core to be removed. Typically the gap between the core and the counterelectrode is kept small to provide a low-resistance current path. The electrolyte is pumped through the gap in order to flush away the dissolved metal ions and also to provide cooling.

The sacrificial core may be a solid metal element, in which case the counterelectrode is generally advanced from an end of the core that is exposed on the surface of the casting into the recess formed by the core. In such an embodiment of the process, the counterelectrode is generally hollow and electrolyte is pumped through the counterelectrode to the gap and flows out around the sides of the counterelectrode.

However, when a solid core is used only a relatively small end surface of the core is exposed to the electrochemical machining process conducted by the counterelectrode. Accordingly, such a procedure is relatively slow. It is preferred to use a hollow member for the sacrificial core and to insert the counterelectrode within the core to provide a relatively narrow gap between the counterelectrode and the shell of the core. When the sacrificial core method is used to form a through passage in a casting, the core may have the shape of a cylindrical shell, open at both ends. The counterelectrode may then be inserted along the axis of the cylinder for maximum exposure of the core to the electrochemical machining process. The counterelectrode can be spaced from the interior wall of the cylindrical shell by means of standoff insulators to prevent short circuits. The electrolyte is then pumped between the shell of the core and the counterelectrode and an electric current is passed to dissolve the core from the inside. If a sacrificial core is used to form a recess in the body of the casting, the core may be a hollow cylinder closed at one end and positioned in the mold to form the recess. The cathode counterelectrode may then be inserted into the interior of the hollow core and the electrolyte can be pumped through a channel in the electrode. This procedure also provides that the core is dissolved from the interior outward.

If the electrochemical machining proceeds evenly in all directions, it may be possible to remove the entire sacrificial core by electrochemical machining. However, if some portions of the core are completely removed while others parts still remain, it may be preferable to remove the final portions of the core by a standard chemical leaching procedure. Nevertheless, removing most of the sacrificial core by electrochemical machining provides a substantially faster core removal process.

When a hollow sacrificial core is used, the counterelectrode may be introduced into the core at the time of the electrochemical machining process, or the core may be manufactured with an integral counterelectrode which stays in the core through the molding process and is connected afterward to the source of electricity and the electrolyte.

Figure 2:
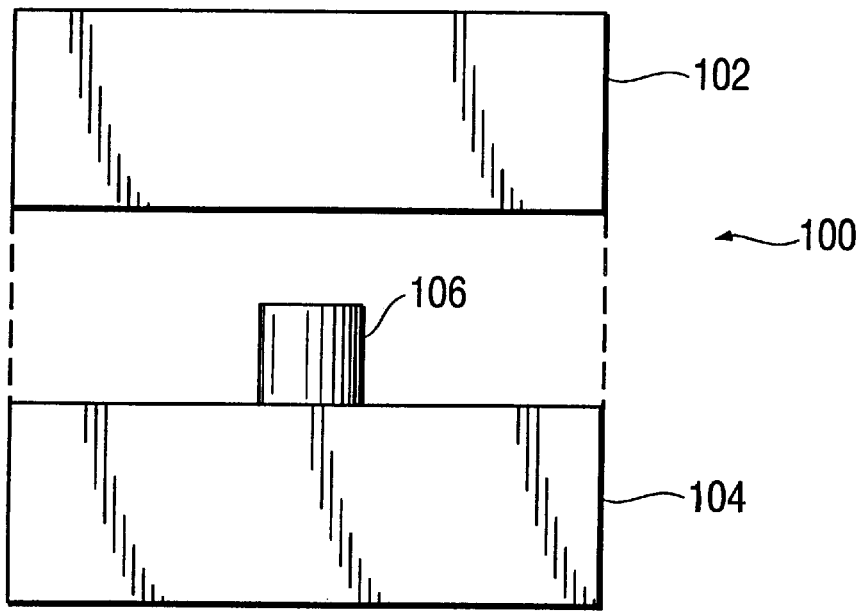
FIG. 2 is a side elevational view of the mold of FIG. 1.
Figure 3:
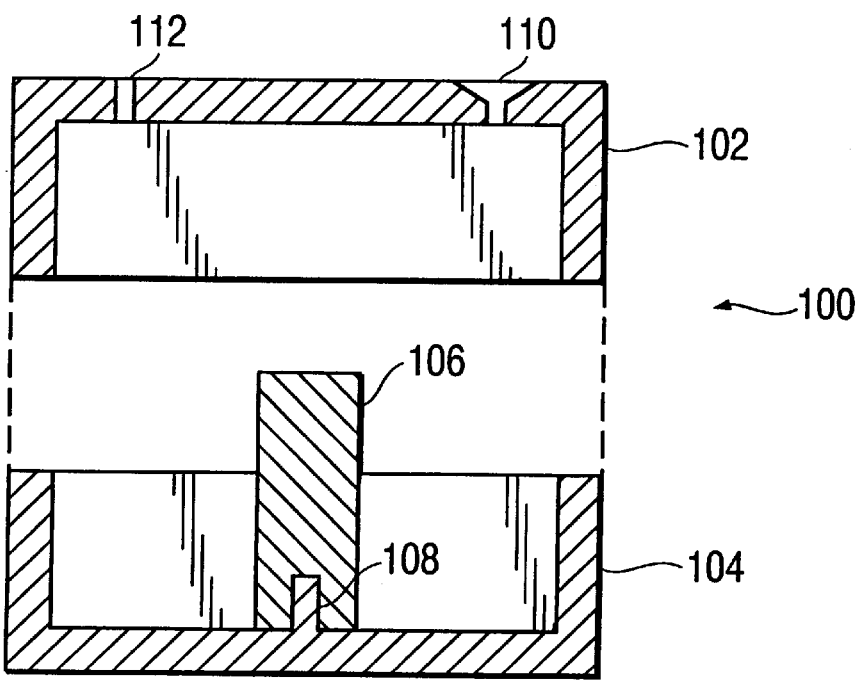
FIG. 3 is a side elevational cross sectional view of the mold of FIG. 1 along the line 3—3 in FIG. 1.

Referring now to the figures of the drawings, FIG. 1 shows an isometric view of a schematic mold 100 of the invention having a top portion 102 and a bottom portion 104, with a sacrificial core 106 fixed within the mold. FIG. 2 shows an elevational view of the mold, and FIG. 3 shows an elevational cross-section of the mold along the line 3—3 in FIG. 1, showing the mold in closed position with the sacrificial core 106 fixed in position within the mold by means of pin 108. The mold 100 is provided with a pour hole 110 and a vent 112.

Figure 4:
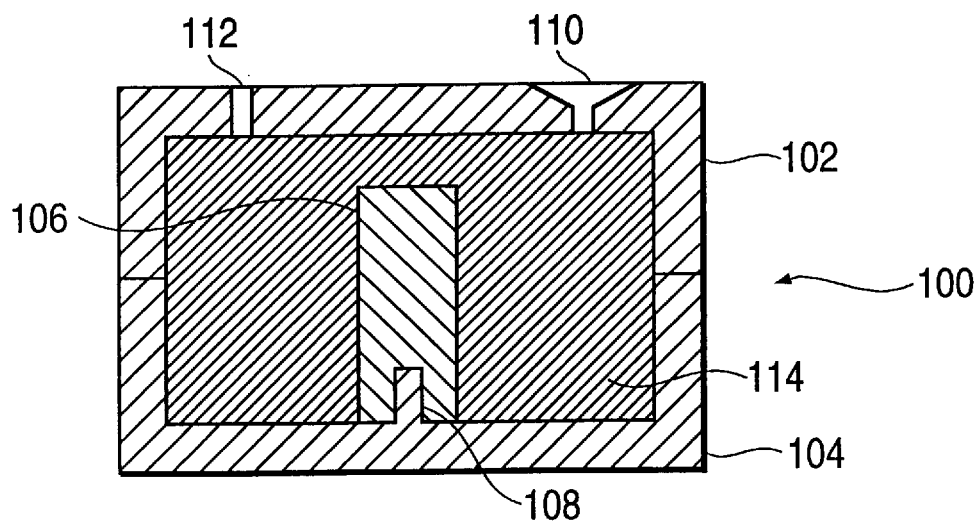
FIG. 4 is a side elevational cross sectional view of the mold of FIG. 1 after a casting has been formed within the mold.

FIG. 4 shows the mold 100 after a liquid material, e.g., a refractory metal alloy, has been poured into the mold and allowed to harden to form the casting 114, having the sacrificial core 106 embedded within the body of the casting.

Figure 5:
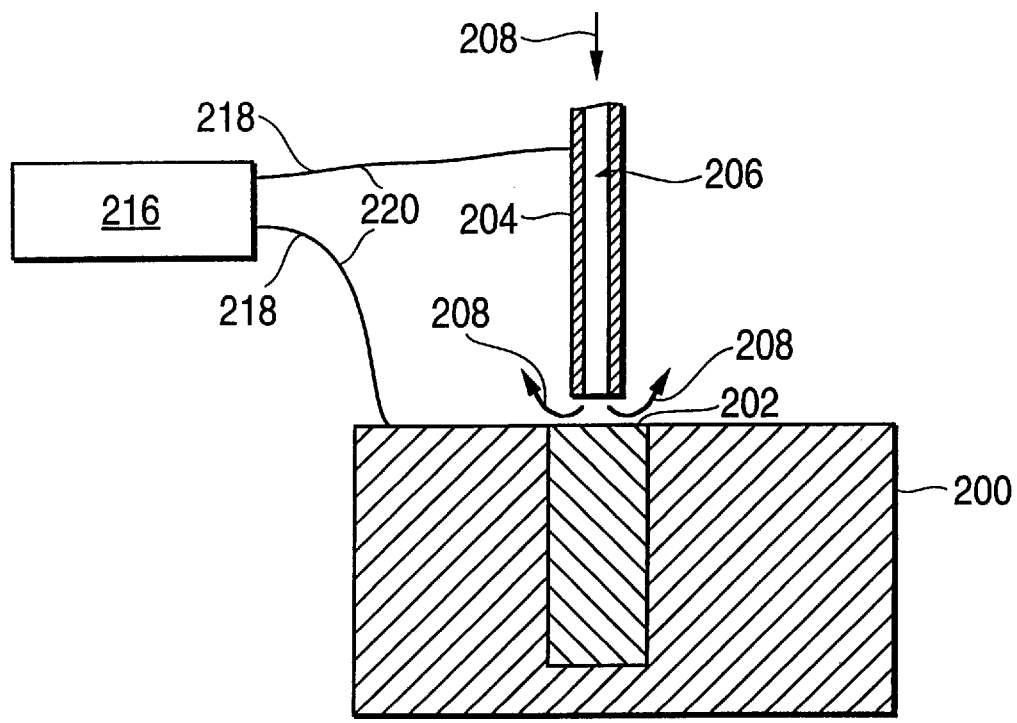
FIG. 5 is a cross-sectional view of a casting as shown in FIG. 4 removed from the mold and arranged for removal of the sacrificial core by electrochemical machining.
Figure 6:
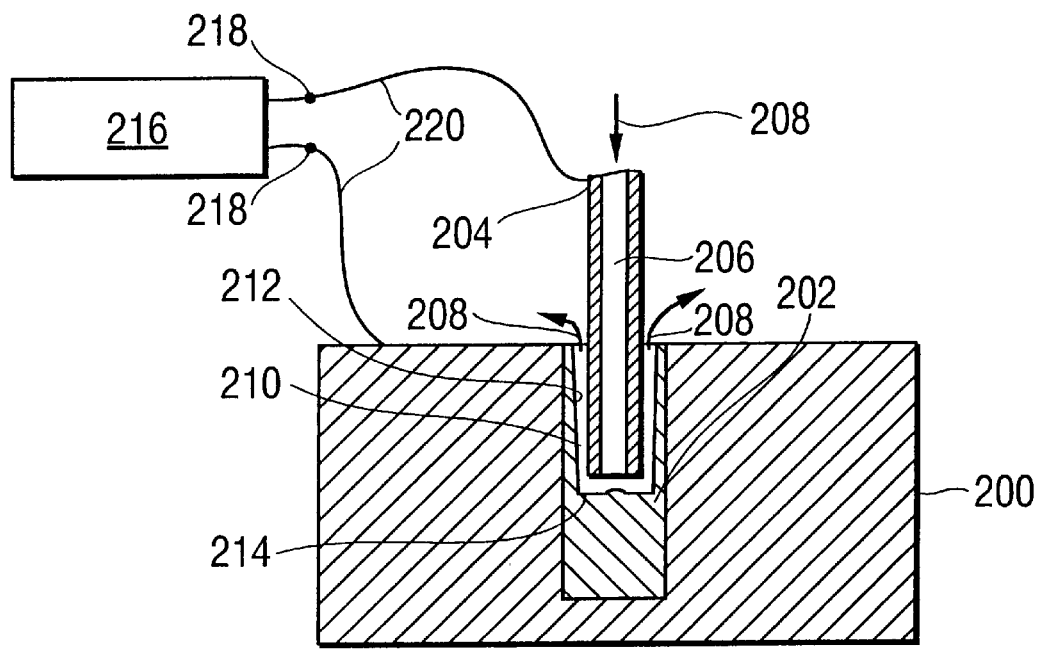
FIG. 6 is a cross-sectional view of the casting of FIG. 5 after the electrochemical machining process has proceeded partway.
Figure 7:
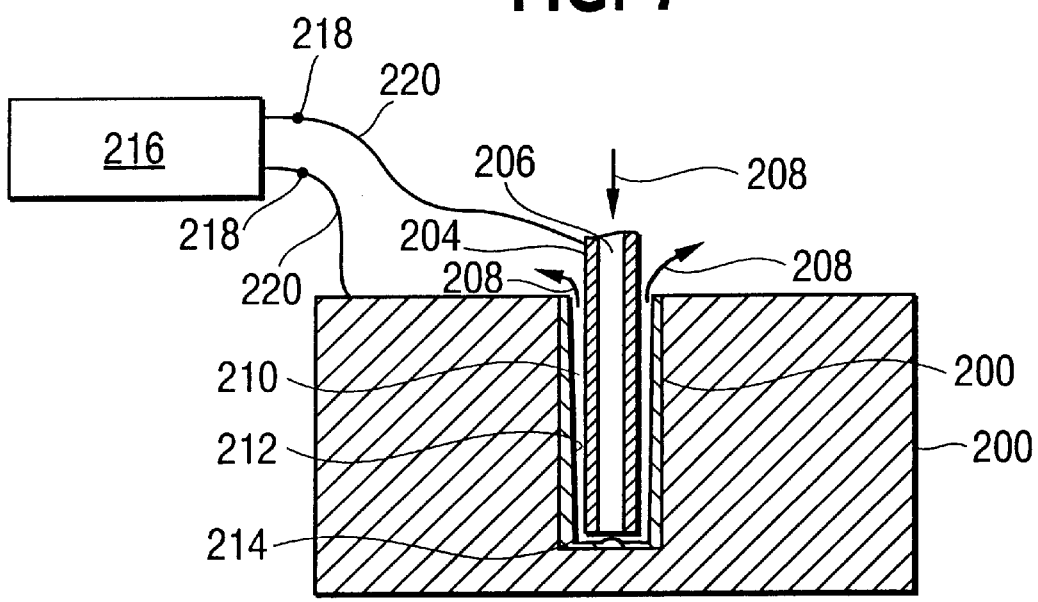
FIG. 7 is a cross-sectional view of the casting of FIG. 5 after the electrochemical machining process has proceeded essentially to completion.

FIGS. 5–7 illustrate the process of the invention using a casting 200 containing a sacrificial core 202, such as might be prepared by the casting procedure outlined above. The casting 200 with core 202 is positioned in a conventional electrochemical machining apparatus having a cathode or counterelectrode 204 with a central channel 206 for supplying an electrolyte to the worksite as indicated by the flow arrows 208. The electrochemical machining apparatus will include means for supporting the casting 200, means for positioning the electrode 204 and advancing it as the machining process proceeds, and means for circulating electrolyte to the electrochemical machining gap between the core 202 and the counterelectrode 204. Such means are conventional in electrochemical machining apparatus and are not shown. The casting and/or core and the electrode are connected to the poles 218 of a source of electric current 216 shown schematically by conductors 220.

The counterelectrode 204 is made generally cathodic with respect to the core 202. Consequently, as the electrochemical machining process proceeds, the core 202 is dissolved and the electrode 204 is advanced to maintain the optimum gap between the electrode 204 and the core 202. FIG. 6 shows a cross-section of the casting 200 and core 202 after the core has been partially removed. The electrochemical machining process has formed a recess 210 having a wall 212 and a bottom 214 in the central portion of the core 202. As the machining process continues, the bottom 214 of the recess 210 approaches the end of the core 202 and the wall 212 of the recess approaches the side of the core 202. When the process has proceeded to the extent shown in FIG. 7, the core removal is nearly complete. It may be possible, as indicated above, to completely remove the core 202 by the electrochemical machining process. However, it is possible to terminate the ECM process and finish removing the core by a chemical leaching step.

Figure 8:
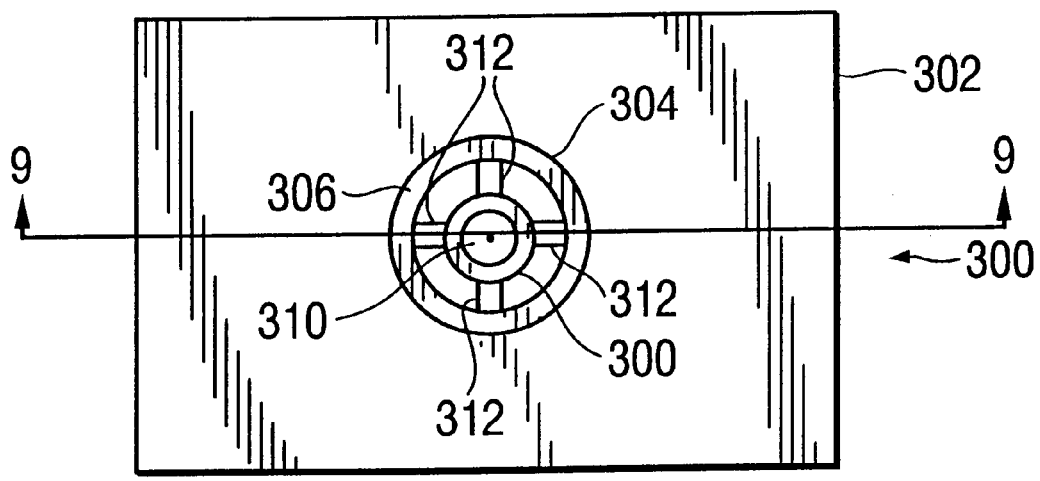
FIG. 8 is a top plan view of a casting containing a sacrificial core with an integral electrode.
Figure 9:
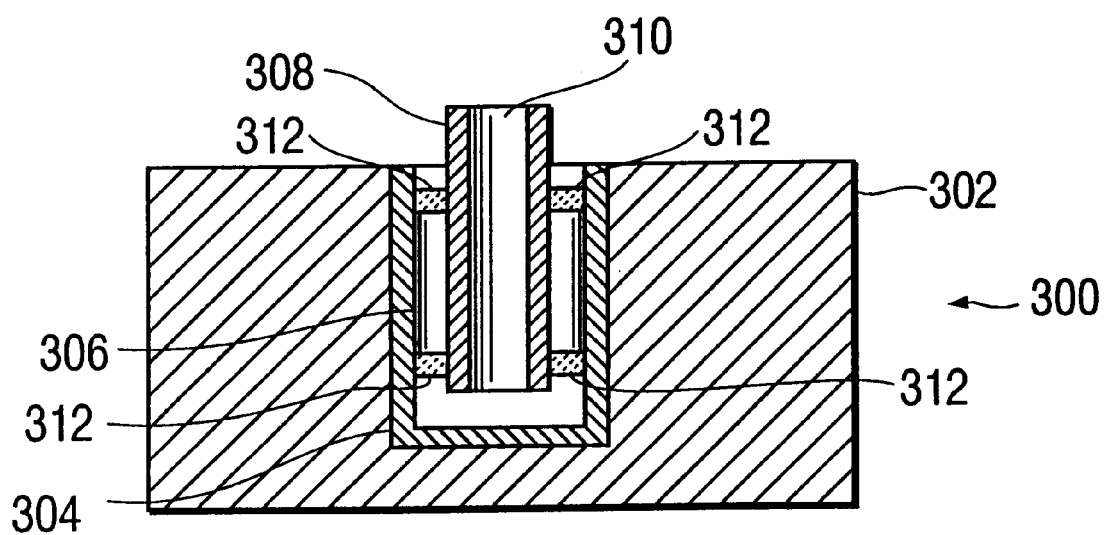
FIG. 9 is a side-elevational cross-sectional view of the casting and core of FIG. 8 taken along the line 9—9 in FIG. 8.

FIGS. 8 and 9 show a top plan view and an elevation cross-section of an embodiment of the invention using a hollow shell-type sacrificial core. A casting and core assembly 300 comprises a casting 302 with a sacrificial core 304 embedded therein by a casting process. The core 304 comprises a shell 306 with an integral counterelectrode 308 having a central channel 310 for supplying electrolyte. The electrode is positioned within the hollow core by means of standoff insulators 312.

Figure 10:
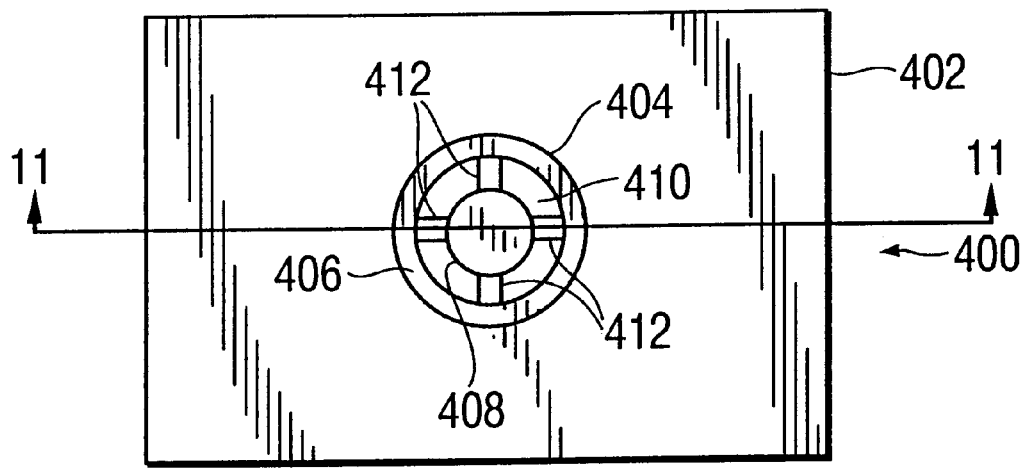
FIG. 10 is a top plan view of a casting containing a sacrificial core with an integral electrode wherein the core is open at both ends.
Figure 11:
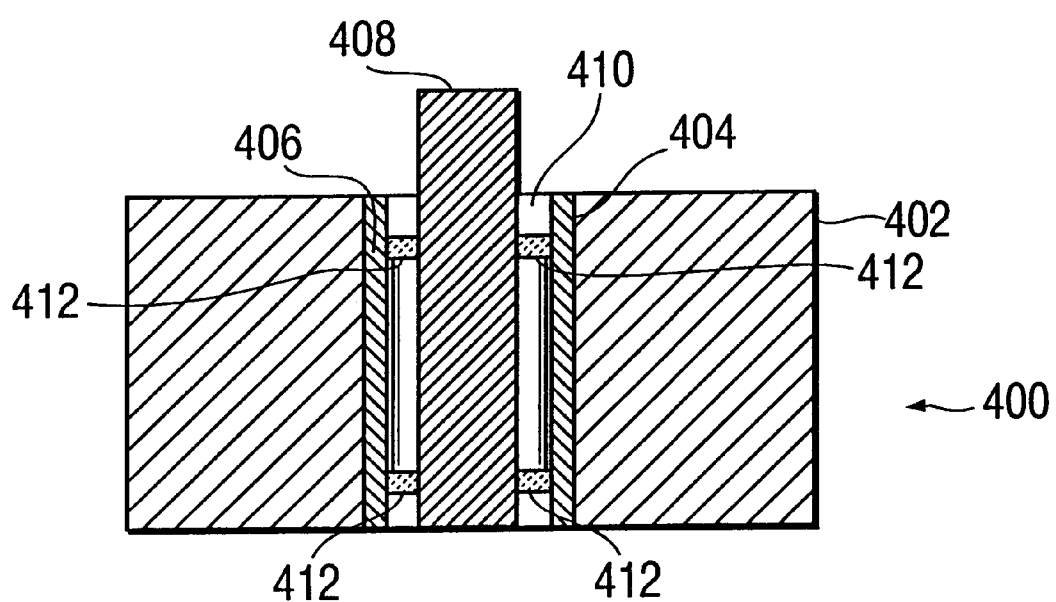
FIG. 11 is a side-elevational cross-sectional view of the casting and core of FIG. 10 taken along the line 11—11 in FIG. 10.

FIGS. 10 and 11 show a top plan view and an elevational cross-section of an embodiment of the invention using a hollow cylindrical sacrificial core for forming a through passage in the casting. The casting and core assembly 400 comprises a casting 402 with a sacrificial core 404 embedded therein by a casting process. The core 404 comprises a cylindrical shell 406 with an integral counterelectrode 408. In this embodiment the counterelectrode 408 is shown as solid and a channel 410 for electrolyte flow is formed by the space between the electrode 408 and the shell 406. The counterelectrode 408 is positioned within the hollow core by means of standoff insulators 412.

The electrochemical machining conditions used for removing the sacrificial cores according to the invention are generally conventional. Electrolytes such as aqueous solutions of sodium chloride, sodium nitrate, sodium sulfate, and mixtures thereof, and the like may be used in conventional concentrations. Electrolytes containing from about 15% to about 35% sodium nitrate or about 15% to about 30% sodium chloride or mixtures thereof have been found to be suitable for removal of steel cores.

In practicing the process of the invention, the potential applied between the cathode and the sacrificial core in the electrochemical cell is adjusted so that the sacrificial core is dissolved, but the material comprising the body of the casting is not dissolved. Such adjustment of the voltage can be determined by skilled practitioner from known electrode potentials of the materials of the casting and core and/or by straightforward experimentation.

The voltage applied between the electrode and sacrificial core may be direct current (DC), pulsed current (PC), or a modulated reversing current provided by a modulated reversing electric field (MREF). If a pulsed current, produced by a modulated electric field, is used, the frequency of the pulses may range from a few Hertz up to about 1000 Hertz. The duty cycle of the pulses may range from about 1% to about 95%.

In certain cases it may be advantageous to use pulse reverse current, produced by modulated reverse electric fields (MREF). MREF may be useful in removing sacrificial cores which are made of a passivating alloy such as nickel alloys and the like. The use of MREF in electrochemical machining of passive metals is disclosed in assignee's copending U.S. patent application Ser. No. 09/080,264, filed May 18, 1998, the entire disclosure of which is incorporated herein by reference.

Figure 12:
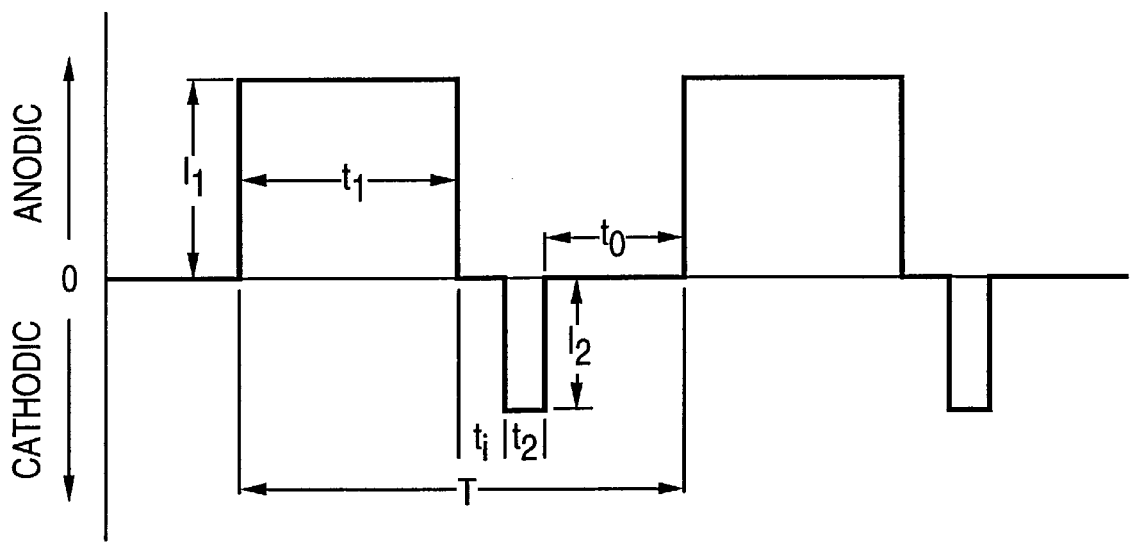
FIG. 12 illustrates the waveform of a modulated reverse electric current used in a preferred embodiment of the invention.

FIG. 12 shows a modulated reverse electric field waveform suitable for use in the process of the invention. In FIG. 12, the anodic peak current is shown as $I_1$ and the anodic on-time is $t_1$. Similarly, the cathodic peak current is shown as $I_2$ and the cathodic on-time is $t_2$. The relaxation time, or off-time is $t_o$, and the intermediate time is shown as $t_i$. The sum of the anodic on-time, cathodic on-time, relaxation period, and intermediate period (if present) is the period T of the pulse train ($T=t_1+t_2+t_o+t_i$), and the inverse of the period of the pulse train (1/T) is the frequency (f) of the pulse. The ratio of the anodic on-time to the period ($t_1/T$) is the anodic duty cycle ($D_1$), and the ratio of the cathodic on-time to the period ($t_2/T$) is the cathodic duty cycle ($D_2$). The current density, i.e., current per unit area of the electrode, during the anodic on-time and cathodic on-time is known as the anodic peak pulse current density and cathodic peak pulse current density, respectively. The anodic charge ($Q_1$) is the product of the anodic current and the anodic on-time ($I_1T_1$), while the cathodic charge ($Q_2$) is the product of the cathodic current and the cathodic on-time ($I_2T_2$). The average current ($I_{ave}$) is the average anodic current ($I_1D_1$) minus the average cathodic current density ($I_2D_2$). Accordingly the relationships among the parameters may be represented by the following equations.

$$T = \frac{1}{f} = t_1 + t_2 + t_o + t_i \qquad (1)$$

$$D_1 = \frac{t_1}{T} \qquad (2)$$

$$D_2 = \frac{t_2}{T} \qquad (3)$$

$$\frac{Q_1}{Q_2} = \frac{I_1 t_1}{I_2 t_2} \qquad (4)$$

$$I_{ave} = I_1 D_1 - I_2 D_2 \qquad (5)$$

$$D_1 + D_2 \leq 1 \qquad (6)$$

The application of modulated reverse current (or electric field) in pulsed current electrochemical machining can alleviate a number of the problems experienced in both direct current (DC) ECM and pulsed current (PC) ECM. For example, use of MREF may promote a more uniform dissolution of the metal from the core and decrease the amount of metal precipitated as hydroxide near the cathode.

It has been found that when removing steel sacrificial cores from a titanium alloy (Ti6AL4V) matrix that pulsed current (modulated electric field, MEF) at peak voltage of about 6.25 volts and a duty cycle of about 80%, with a relatively short on-time, i.e., frequency greater than 100 Hertz, and a relatively large gap size of greater than about 0.5 mm, using 15% aqueous sodium nitrate as an electrolyte gave the best results.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. A method for removing a sacrificial core from a casting comprising
providing a sacrificial core in a casting,
said sacrificial core comprising a hollow shell of an electrolytically dissolvable metal and a counterelectrode positioned within said hollow shell and electrically insulated therefrom, said sacrificial core having an electrolyte channel between said hollow shell and said counterelectrode, contacting said shell and said counterelectrode with an electrolyte, passing an electric current between said hollow shell and said counterelectrode wherein said hollow shell is predominantly anodic with respect to said counterelectrode.

2. The method of claim 1 wherein said electrolytically dissolvable metal is steel.

3. The method of claim 1 wherein said casting is made from a metal.

4. The method of claim 1 wherein said metal is a refractory alloy, selected from the group consisting of alloys of nickel, alloys of cobalt and alloys of titanium.

5. The method of claim 1 wherein said hollow shell has a single opening through which said electrolyte is introduced and withdrawn.

6. The method of claim 5 wherein said electrolyte is introduced through a passage within said counterelectrode.

7. A method of making a casting having a recess comprising providing a mold having a sacrificial core,
said sacrificial core comprising a hollow shell of an electrolytically dissolvable metal and a counterelectrode positioned within said hollow shell and electrically insulated therefrom, said sacrificial core having an electrolyte channel between said hollow shell and said counterelectrode, filling said mold with a hardenable flowable material,
hardening said flowable material in said mold, whereby a solid casting is formed having a sacrificial core embedded therein, contacting said shell and said counterelectrode with an electrolyte, passing an electric current between said shell and said counterelectrode, wherein said hollow shell is predominantly anodic with respect to said counterelectrode.

8. The method of claim 7 wherein said electrolytically dissolvable metal is steel.

9. The method of claim 7 wherein said casting is made from a metal.

10. The method of claim 9 wherein said metal is a refractory alloy, selected from the group consisting of alloys of nickel, alloys of cobalt and alloys of titanium.

11. The method of claim 7 wherein said hollow shell has a single opening through which said electrolyte is introduced and withdrawn.

12. The method of claim 11 wherein said electrolyte is introduced through a passage within said counterelectrode.

13. A sacrificial core for a casting said core comprising a hollow shell of an electrolytically dissolvable metal and an electrically conductive electrode positioned within said hollow shell and electrically insulated from said hollow shell.

14. The sacrificial core of claim 10 wherein said hollow shell has a single opening through which said electrolyte is introduced and withdrawn.

15. The sacrificial core of claim 14 wherein said electrically conductive electrode is provided with a passage for introducing electrolyte into said hollow shell.

* * * * *